(12) United States Patent
Chen

(10) Patent No.: US 7,631,158 B2
(45) Date of Patent: Dec. 8, 2009

(54) DISK SNAPSHOT METHOD USING A COPY-ON-WRITE TABLE IN A USER SPACE

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 417 days.

(21) Appl. No.: 11/700,187

(22) Filed: Jan. 31, 2007

(65) Prior Publication Data

US 2008/0183990 A1 Jul. 31, 2008

(51) Int. Cl.
*G06F 12/00* (2006.01)
(52) U.S. Cl. .................... 711/162; 711/170; 711/171; 711/173
(58) Field of Classification Search .................. None
See application file for complete search history.

(56) References Cited

U.S. PATENT DOCUMENTS 6,081,875 A * 6/2000 Clifton et al. ............... 711/162

2007/0156985 A1 * 7/2007 Tsai et al. .................... 711/162

* cited by examiner

*Primary Examiner*—Reginald G Bragdon
*Assistant Examiner*—Shawn X Gu
(74) *Attorney, Agent, or Firm*—Bacon & Thomas, PLLC

(57) ABSTRACT

The invention provides a disk snapshot method applied to a server, wherein a snapshot operating module is installed in a kernel space within a memory of the server. When performing disk snapshot, the server receives a create instruction sent by the snapshot operating module, groups all disk chunks containing data in a hard disk of the server as a volume, divides a disk snapshot storage area in the hard disk for storing the original data of each disk chunks belonged to the volume. When the original data of each disk chunks belonged to the volume need to be modified, the original data were first copied to the disk snapshot storage area, then the original data of the volume were modified into modification data, and Copy-On-Write table is created in a user space within the memory and lookup information is written into the Copy-On-Write table, wherein the lookup information contains the information of which disk chunk of the disk snapshot storage area is the original data stored.

6 Claims, 4 Drawing Sheets

DISK SNAPSHOT METHOD USING A COPY-ON-WRITE TABLE IN A USER SPACE

FIELD OF THE INVENTION

The invention relates to a server, more particularly to a method applied to a server having a snapshot operating module installed in a kernel space within a memory of the server for providing a user space within the memory to store a Copy-On-Write table and lookup information thereof.

BACKGROUND OF THE INVENTION

The general operating systems nowadays support a disk snapshot technique which is also called volume shadow copy services. Being different from general data backup techniques which relate to file copying, the so-called disk snapshot technique preserves the file system and backs up the volume (the volume refers to the disk chunks containing data in a hard disk) of a hard disk anytime the users desire. When performing disk snapshot, there is no file copying operation and the directory structure of the file system in use will be preserved completely. Hence, the disk snapshot technique is able to establish volumes of a hard disk of different time versions, thus improve the conventional backup method. Besides, when a hard disk got damaged or infected, the administrator may replace the original volume by the disk snapshots established in advance to minimize the loss.

As stated above, there is no file copying when performing disk snapshot. Instead, when the disk chunk of the volume is changed, the original data of the disk chunk of the volume is copied to other available disk chuck which does not belong to the volume, then the original data of the disk chunk of the volume is modified into modification data, at the same time a Copy-On-Write table (hereinafter abbreviated as "COW table") is created in a memory space used by the internal kernel of the operating system (for example: Linux) provided by the memory of the server. The COW table records the information of which disk chunk of the hard disk is the original data of each disk chunk stored. The technique stated above is called the Copy-On-Write technique.

However, the memory space of the operating system kernel is limited, and will not increase as the system memory getting larger. When the change of the disk chunk of the volume increases, the memory space of the operating system kernel occupied by the COW table becomes larger. The internal kernel space will be occupied by a huge number of COW table when performing disk snapshot at different time or when the amount of the volume increases tremendously, results in collapse of the operating system. As a result, there exists urgent need of other disk snapshot method to solve the problems stated above.

SUMMARY OF THE INVENTION

For the purpose of solving the problems stated above, after hark work of research and experiments for a long time, the inventor has developed a disk snapshot method which efficiently solves the problem of collapse of the operating system due to the exhaustion of kernel space.

The invention provides a disk snapshot method applied to a server which comprises a memory and a hard disk, wherein the memory is divided to have a kernel space and a user space. Inside the kernel space, there is a snapshot operating module. When performing disk snapshot, the server receives a create instruction sent by the snapshot operating module, groups all disk chunks containing data in the hard disk as a volume, divides a disk snapshot storage area in the hard disk for storing the original data of each disk chunks belonged to the volume. When the original data of each disk chunks belonged to the volume need to be modified, the original data were first copied to the disk snapshot storage area, then the original data of the volume were modified into modification data, and Copy-On-Write table is created in the user space and lookup information is written into the Copy-On-Write table, wherein the lookup information contains the information of which disk chunk of the disk snapshot storage area is the original data stored. Since the space of the kernel space occupied by the snapshot operating module is fixed instead of increases with the number of the disk chunks belonged to the volume modified, and Copy-On-Write table is stored in the user space which is with a much larger storage space than the kernel space, the kernel space will no longer be occupied by the Copy-On-Write table, thus reduce the use of kernel space. Meanwhile, the server is not going to fail when performing disk snapshot which makes the server more stable.

Besides, when receiving a query instruction sent by the snapshot operating module which intends to access the disk snapshot storage area, the server reads Copy-On-Write table stored in the user space to obtain each lookup information, and makes sure that the original data of each disk chunk of the volume still stored in the volume or the disk chunk of the disk snapshot storage area according to each of them.

Also, when receiving a removal instruction sent by the snapshot operating module, the server removes the Copy-On-Write table in the user space and the disk snapshot storage area.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENT

Figure 1:
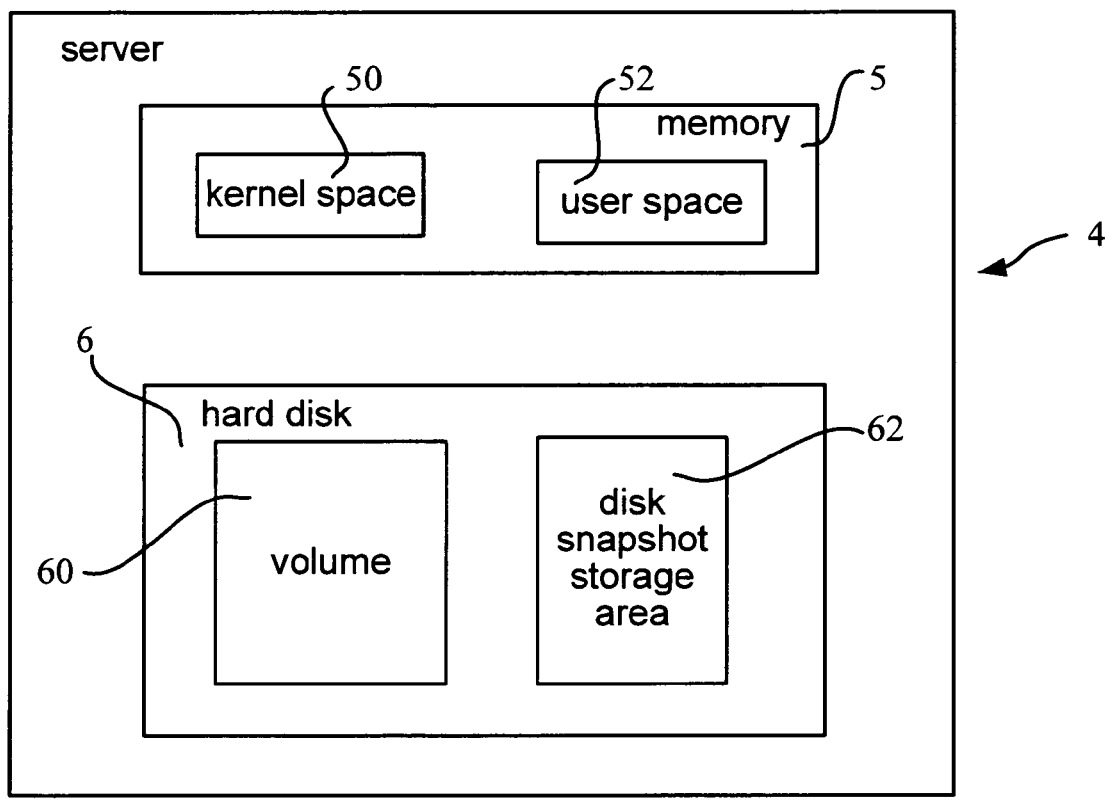
FIG. 1 shows the structure of a preferred embodiment of the present invention.
Figure 2:
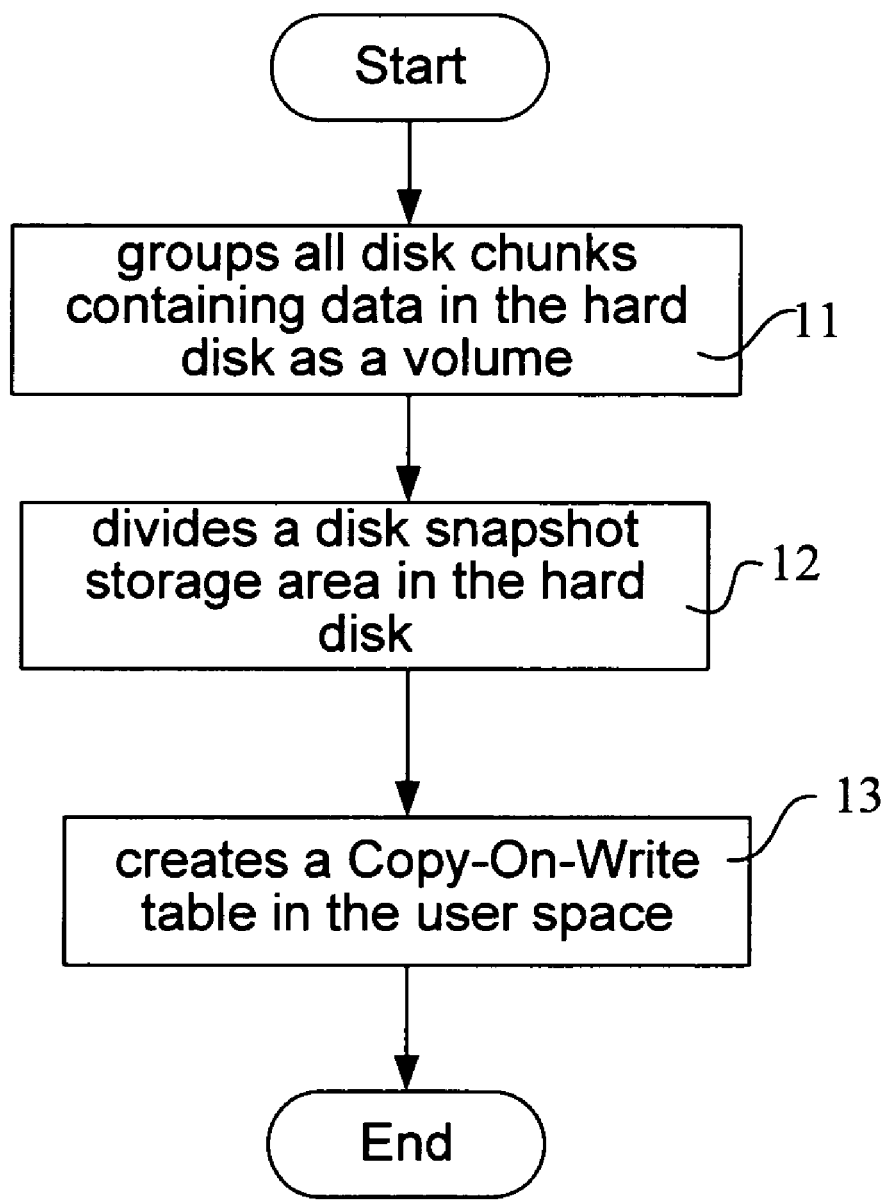
FIG. 2 is a flow chart of a preferred embodiment of the present invention showing the steps of performing disk snapshot.

Please refer to FIGS. 1 and 2, the invention of disk snapshot method is applied to a server 4 which comprises at least a memory 5 and at least a hard disk 6, wherein the memory 5 is divided to have a kernel space 50 and a user space 52 in advance. Inside the kernel space 50, there is a snapshot operating module. When performing disk snapshot upon the hard disk 6, a user may generate a create instruction via the snapshot operating module. Then, when receiving the create instruction, server 4 performs disk snapshot with following steps:

(11) groups all disk chunks containing data in the hard disk 6 as a volume 60;

(12) divides a disk snapshot storage area 62 in the hard disk 6, and the size of the disk snapshot storage area 62 is equal to the space needed to copy all original data of the disk chunks belonged to the volume 60 to the disk snapshot storage area 62; and

(13) creates a Copy-On-Write table (COW table for short) in the user space 52, and writes a plurality of lookup information into the COW table, wherein each lookup information comprises an original address and a corresponding snapshot address respectively.

Figure 3:
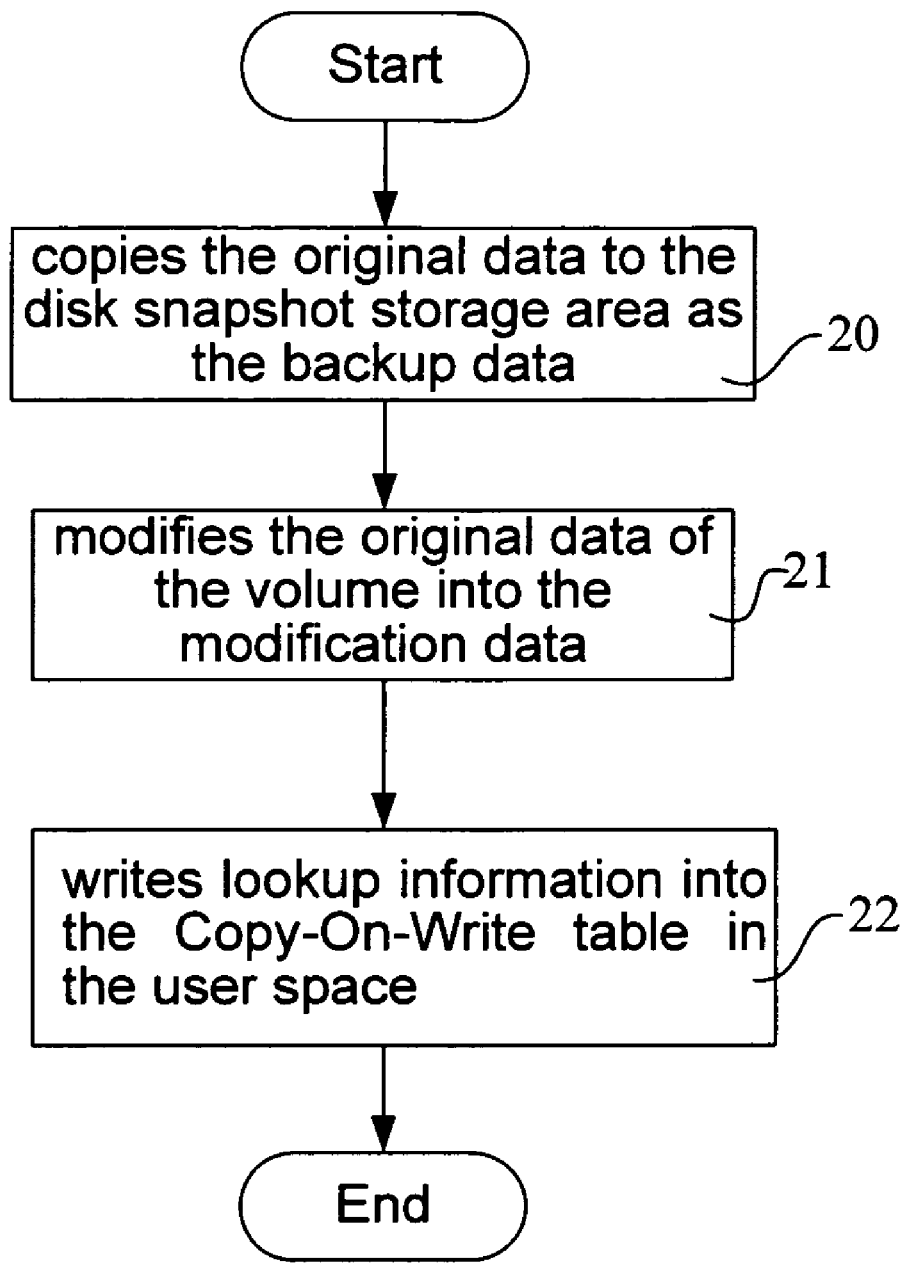
FIG. 3 is a flow chart of a preferred embodiment of the present invention showing the steps of modifying the original data when needed.

Please refer to FIG. 3, in one embodiment of the invention, after the disk snapshot storage area 62 is created, when the original data of the disk chunk of the volume 60 needed to be modified, server 4 proceeds with following steps:

(20) copies the original data of the disk chunk to be modified to one of the disk chunks of the disk snapshot storage area 62 as the backup data;

(21) modifies the original data of the volume 60 into the modification data; and

(22) writes lookup information into the COW table in the user space 52, wherein the lookup information comprises the address of the modification data as an original address and the address of the backup data as a corresponding snapshot address.

Figure 4:
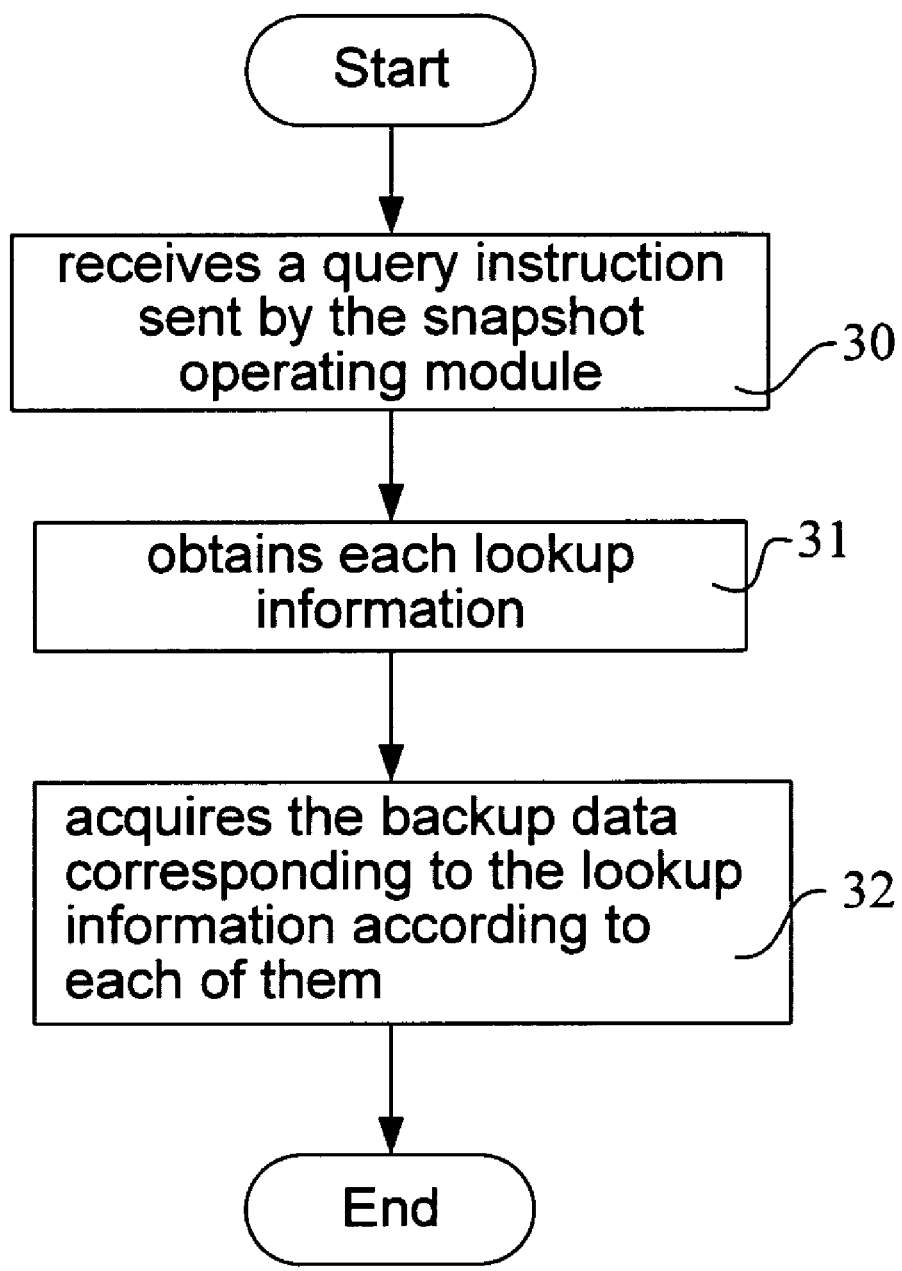
FIG. 4 is a flow chart of a preferred embodiment of the present invention showing the steps of accessing the disk snapshot storage area.

Please refer to FIG. 4, in said embodiment of the invention, when accessing the disk snapshot storage area 62, server 4 proceeds with following steps:

(30) receives query instruction sent by the snapshot operating module;

(31) reads COW table stored in the user space 52 to obtain each lookup information; and

(32) acquires the backup data corresponding to said lookup information according to each of them.

In said embodiment of the invention, when removing the disk snapshot storage area 62, the server 4 first receives a removal instruction sent by the snapshot operating module, then removes the COW table in the user space 52 and backup data stored in the disk snapshot storage area 62.

In said embodiment of the invention, when server 4 modifies the modification data of the disk chunk of the volume 60, the modification data of the disk chunk of the disk is modified directly instead of stores modification data in the disk snapshot storage area 62 so as to preserve the backup data of the disk chunk of the volume 60 in which the modification data has been written. Thus, when recovering the original address, server 4 may read COW table, acquire lookup information corresponding to said original address, acquire the snapshot address corresponding to said original address and backup data corresponding to the snapshot address, and overwrite the original address with the backup data.

As stated above, the COW table is stored in the user space 52 of the memory 5, and duo to the size of the user space 52 is larger than the kernel space 50, the possibility that the user space 52 is stuffed by the COW table is much lower. Besides, the kernel space 50 stores only the snapshot operating module which occupies a limited storage space, so the kernel space 50 will no longer be occupied by the COW table, thus reduce the use of kernel space 50. Meanwhile, the possibility that the server 4 fails when performing disk snapshot would be much lower which makes the server 4 more stable.

While the invention herein disclosed has been described by means of specific embodiments, numerous modifications and variations could be made thereto by those skilled in the art without departing from the scope and spirit of the invention set forth in the claims.

What is claimed is:

1. A disk snapshot method, which is applied in a server comprising at least a memory and a hard disk, wherein said memory is divided into a kernel space and a user space in advance, and inside said kernel space there is a snapshot operating module, when receiving a create instruction sent by said snapshot operating module, said server performs disk snapshot comprising the steps of:

grouping all disk chunks containing data in said hard disk as a volume;

dividing a disk snapshot storage area in said hard disk, wherein the size of said disk snapshot storage area is equal to a space needed to copy all original data of the disk chunks belonged to the volume to said disk snapshot storage area; and creating a Copy-On-Write table in said user space, wherein said Copy-On-Write table comprises a plurality of lookup information and each of said lookup information comprises an original address and a snapshot address corresponding to said original address.

2. A disk snapshot method of claim 1, wherein after said disk snapshot storage area is created, when the original data of one of said disk chunks of said volume needed to be modified, said server performs the steps of:

copying said original data of one of said disk chunks to be modified to one of the disk chunks of said disk snapshot storage area as backup data;

modifying said original data of one of said disk chunks of said volume into modification data; and writing lookup information into said Copy-On-Write table in said user space, wherein said written lookup information comprises the address of said modification data as the original address in the written lookup information and the address of the backup data as the snapshot address corresponding to the original address in the written lookup information.

3. A disk snapshot method of claim 2, wherein when accessing said disk snapshot storage area, said server performs the steps of:

receiving a query instruction sent by said snapshot operating module;

reading said Copy-On-Write table stored in said user space to obtain each of said lookup information; and acquiring backup data corresponding to lookup information according to each of said obtained lookup information.

4. A disk snapshot method of claim 2, wherein when receiving a removal instruction sent by said snapshot operating module, said server removes the Copy-On-Write table in said user space and said backup data in said disk snapshot storage area.

5. A disk snapshot method of claim 2, wherein when modifying one of said disk chunks of said volume in which said modification data stored, said server modifies one of said disk chunks directly.

6. A disk snapshot method of claim 2, wherein when recovering original address of said written lookup information, said server performs the steps of:

reading said Copy-On-Write table to acquire said written lookup information corresponding to said original address of said written lookup information;

acquiring said snapshot address corresponding to said original address of said written lookup information and backup data corresponding to said snapshot address; and overwriting said original address of said written lookup information with said backup data corresponding to said snapshot address data for recovery.

* * * * *